United States Patent
Karlsson et al.

(10) Patent No.: US 10,377,384 B2
(45) Date of Patent: Aug. 13, 2019

(54) METHOD FOR CONTROLLING A DRIVETRAIN OF A VEHICLE COMPRISING A MULTI-CLUTCH TRANSMISSION

(71) Applicant: VOLVO TRUCK CORPORATION, Göteborg (SE)

(72) Inventors: Lars Karlsson, Göteborg (SE); Johan Bjernetun, Mölnlycke (SE)

(73) Assignee: Volvo Truck Corporation, Göteborg (SE)

( * ) Notice: Subject to any disclaimer, the term of this patent is extended or adjusted under 35 U.S.C. 154(b) by 332 days.

(21) Appl. No.: 15/502,213

(22) PCT Filed: Sep. 5, 2014

(86) PCT No.: PCT/EP2014/002408
§ 371 (c)(1),
(2) Date: Feb. 7, 2017

(87) PCT Pub. No.: WO2016/034188
PCT Pub. Date: Mar. 10, 2016

(65) Prior Publication Data
US 2017/0232971 A1  Aug. 17, 2017

(51) Int. Cl.
*B60K 28/16* (2006.01)
*B60W 30/18* (2012.01)
(Continued)

(52) U.S. Cl.
CPC ..... *B60W 30/18172* (2013.01); *B60K 28/165* (2013.01); *B60W 10/06* (2013.01);
(Continued)

(58) Field of Classification Search
None
See application file for complete search history.

(56) References Cited

U.S. PATENT DOCUMENTS 3,701,568 A * 10/1972 Lewis et al. ........ B60T 8/17633
303/182
3,820,857 A *  6/1974 Schnaibel et al. ...... B60T 8/173
188/181 A
(Continued)

FOREIGN PATENT DOCUMENTS

DE  10308697 A1  9/2003
JP  02199355 A *  8/1990
(Continued)

OTHER PUBLICATIONS

International Search Report (dated May 21, 2015) for corresponding International App. PCT/EP2014/002408.
(Continued)

*Primary Examiner* — Shelley Chen
(74) *Attorney, Agent, or Firm* — WRB-IP LLP

(57) ABSTRACT

A method is provided for controlling a drivetrain of a vehicle, wherein the drivetrain comprises a multi-clutch transmission. The gear shift of the multi-clutch transmission is adapted to be performed either by power cut shift or by power shift dependent on predetermined vehicle shift conditions. The method includes detecting at least one of a plurality of indications of slippery road conditions and setting a slip risk factor, wherein the slip risk factor is dependent on the indication of slippery road conditions. If the slip risk factor is above a first predetermined threshold value the method further comprises controlling the multi-clutch transmission such that an upcoming gear shift is performed as a power-shift independently of if upcoming shift was determined to be performed as a power-cut shift or as a power shift.

15 Claims, 5 Drawing Sheets

(51) Int. Cl.
*B60W 10/113* (2012.01)
*B60W 30/19* (2012.01)
*F16H 59/66* (2006.01)
*F16H 61/02* (2006.01)
*F16D 21/02* (2006.01)
*F16H 61/682* (2006.01)
*F16D 48/06* (2006.01)
*B60W 10/06* (2006.01)
*F16H 61/688* (2006.01)
*F16H 59/52* (2006.01)
*F16H 61/684* (2006.01)
*F16H 59/02* (2006.01)
*F16H 59/50* (2006.01)

(52) U.S. Cl.
CPC .......... *B60W 10/113* (2013.01); *B60W 30/19* (2013.01); *F16D 21/02* (2013.01); *F16D 48/062* (2013.01); *F16H 59/66* (2013.01); *F16H 61/0213* (2013.01); *F16H 61/682* (2013.01); *F16H 61/688* (2013.01); *B60W 2510/1005* (2013.01); *B60W 2520/263* (2013.01); *B60W 2530/10* (2013.01); *B60W 2540/04* (2013.01); *B60W 2550/14* (2013.01); *B60W 2550/142* (2013.01); *B60W 2550/148* (2013.01); *B60W 2550/40* (2013.01); *B60W 2710/0666* (2013.01); *B60W 2710/1005* (2013.01); *B60W 2710/105* (2013.01); *F16D 2500/312* (2013.01); *F16D 2500/5075* (2013.01); *F16D 2500/51* (2013.01); *F16D 2500/5102* (2013.01); *F16D 2500/70458* (2013.01); *F16H 59/52* (2013.01); *F16H 61/684* (2013.01); *F16H 2059/0221* (2013.01); *F16H 2059/506* (2013.01); *F16H 2059/663* (2013.01); *F16H 2059/666* (2013.01); *F16H 2061/0239* (2013.01); *F16H 2306/30* (2013.01)

(56) References Cited

U.S. PATENT DOCUMENTS

| 5,445,574 | A | * | 8/1995 | Sekiguchi | ........... F16F 15/1442 464/89 |
| 5,911,771 | A | * | 6/1999 | Reichart | ................. F16H 59/60 477/97 |
| 6,330,505 | B1 | * | 12/2001 | Schmitt | .................. B60T 8/172 180/197 |
| 8,150,592 | B2 | | 4/2012 | Song et al. | |
| 10,093,355 | B1 | * | 10/2018 | Wang | .................. B62D 11/003 |
| 2008/0154472 | A1 | * | 6/2008 | Okuda | ..................... B60K 6/44 701/93 |
| 2010/0154584 | A1 | | 6/2010 | Hegerath et al. | |

FOREIGN PATENT DOCUMENTS

| JP | 06324138 | 11/1994 |
| JP | 08324298 | 12/1996 |
| JP | 09144873 | 6/1997 |
| JP | 09303544 | 11/1997 |
| JP | 10264791 | 10/1998 |
| JP | 10299530 | 11/1998 |
| JP | 2002195067 | 7/2002 |
| JP | 2004291837 | 10/2004 |
| JP | 2009198007 | 9/2009 |
| JP | 2010143363 | 7/2010 |

OTHER PUBLICATIONS

Japanese Official Action (dated Jun. 1, 2018) for corresponding Japanese App. 2017-512831.

* cited by examiner

METHOD FOR CONTROLLING A DRIVETRAIN OF A VEHICLE COMPRISING A MULTI-CLUTCH TRANSMISSION

BACKGROUND AND SUMMARY

The invention relates to a method for controlling a drivetrain of a vehicle. The invention can be applied in heavy-duty vehicles, such as tracks, buses and construction equipment. Although the invention will be described with respect to a heavy-duty vehicle, the invention is not restricted to this particular vehicle. The method of the present invention may also be used in other vehicles such as e.g. passenger cars.

For a vehicle driving on a surface, when the friction coefficient between the wheels of the vehicle and the surface becomes to low the wheels of the vehicle will start to spin. The friction coefficient of the surface is dependent on the properties of the surface and ambient conditions, such as e.g. temperature and humidity. However, wheel spin may also be initiated by a sudden increase in torque delivered by the wheels such when accelerating hard or when a new gear has been engaged. Thus, in order to avoid wheel spin it is desirable to drive on the same gear for as long as possible. Driving on the same gear for as long as possible is also desirable from a driver comfort perspective.

To prevent the wheels from spinning the torque delivered by an engine to the wheels and from the wheels to the surface may be limited or instantly reduced. This can be achieved by the driver lowering the torque request. For the vehicles of today such lowering of speed is often controlled by auxiliary system working to prevent wheel spin such as e.g. Electronic Brake Systems (EBS). Thus, such systems may affect the behaviour of the vehicle in an unpredictable way for the driver. When using an automatic transmission system and driving uphill wheel slip may initiate that the torque delivered by the engine, to the wheels automatically is lowered. Lowering the torque delivered by the engine may result in that a gear change is performed since fee engine can be driven in a more energy efficient way on lower gears. The gear change may cause the wheels to start slipping again with a new lowering of the delivered torque as a result, and may result in that the vehicle ultimately is stopped.

When wheel slip occurs the vehicle may behave in a manner unexpected by the driver. Wheel can be impairing for the ability to steer the vehicle. The driver may e.g. also not get the anticipated acceleration response winch will ruled the driving comfort but which also may be negative from a vehicle safety perspective. E.g. may an unexpected automatic lowering of acceleration response due to wheel spin, be devastating if performed during an overtaking.

For a multi clutch transmissions such as e. g. a Dual Clutch Transmission (DCT) a gear change can be performed either by conventional power cut shift or by power shift. Heavy-duty vehicle is provided with a main transmission and a range transmission. The main transmission is of a multi-clutch type enabling power shift between even and uneven gear steps in the main transmission. The main transmission can also be shifted by using power cut shift. If power cut shift is applied gears can be skipped and shift from an uneven gear to another uneven gear, or from an even gear to another even gear, is possible. The range transmission, for which, shift between low register gears and high register gears is performed, is always shifted by power cut shift.

During power cut shift the torque delivered by the Internal Combustion Engine (ICE) to the wheels is removed before a current, first gear is disengaged. This is done by disengaging the clutch of the current, first gear. Subsequently a new, second gear is engaged by engaging the clutch of the second gear. During power shift the transition from the current first gear to the second gear is performed without torque interruption. This is accomplished by that the clutch of fee first gear slips out while the clutch of fee second gear slips in such that the clutches transfer torque during an overlapping period. Power shift leads to higher wear of the clutches and higher feet consumption since when using power shift the clutches have to be engaged and disengaged subsequently, and skipping of gears, which is beneficial for the fuel consumption, is not possible.

If an upcoming gear change of a multi clutch transmission is performed by power cut shift or power shift can be determined based on a number of parameters such as fuel efficiency, vehicle weight, driver request road inclination and clutch wear. Typically, a gear change performed by power cut shift is performed at low range whereas gear change by power shift is performed at high range. Power cut shift is also generally favourable when the torque delivered by the engine is constant, such as during high way driving at constant speed, where a torque interruption is not that noticeable for the driver. But for gear change during acceleration or when driving uphill said change can advantageously be performed by power shift. If said upcoming gear change is performed by power shift or power cut shift is also dependent on between which gears said upcoming change is to be performed. Power shift can only be performed for sequential gear shifts whereas during power cut shift intermediate gears can be skipped.

U.S. Pat. No. 8,150,592 B2 discloses a method for automatically preventing drive wheel from spinning for a vehicle with a DCT. According to U.S. Pat. No. 8,150,592 B2 a first, currently engaged clutch is assigned a first gear and a second clutch unit, currently disengaged, is assigned a second gear, wherein said second gear is a higher gear than said first gear. When wheel spin of at least one driving wheel is detected the first, currently engaged clutch unit is disengaged and the second, currently disengaged clutch unit is engaged. Engaging the higher gear results in that the torque transferred from the ICE to the wheels is reduced and thus further wheel spin is prevented.

According to U.S. Pat. No. 8,150,592 B2 wheel spin is detected first after wheel spin has occurred. In some situations, such as e.g. when driving uphill, it is desirable to avoid wheel spin completely. Thus, there is a need for further improvements.

It is desirable to provide a method for controlling a drivetrain of a vehicle wherein said method improves the drivability of the vehicle, e.g. by that the vehicle behaviour becomes more predictable.

When driving on slippery roads there is an imminent risk of wheel spin. This applies particularly if additional torque is requested such as during acceleration or when driving uphill. During wheel spin traction is lost which is undesirable from a driving comfort perspective, but also, loosing traction of the vehicle reduces the controllability of the vehicle. Thus, by reducing unpredicted wheel spin both driveability and vehicle safety can be improved.

Power cut shift implies a sudden increase in transferred torque when the clutch of the second gear is engaged and is therefore unfavourable if trying to avoid wheel spin. At power shift the gear shift is performed without interrupting the torque delivery from the ICE to the wheels, which is advantageous in order to avoid wheel spin.

The present invention provides a method for controlling the drivetrain of a vehicle comprising a multi-clutch transmission. The shifting of said multi-clutch transmission is adapted to be performed either by power cut shifting or by power shifting. If said shift is performed by power cut shift or by power shift is dependent on at least one of a number of predetermined vehicle shift conditions.

According to the present invention said method comprises the steps of detecting at least one of a plurality of indications of slippery road conditions and setting a slip risk factor. The indications of slippery road conditions may be either indications of that it is predicted that the road will be slippery or indications of that the road is slippery. Said slip risk factor is a value indicating the risk that the wheels of the vehicle will start to slip and is dependent on said indications of slippery road conditions. The slip risk factor may be set either solely based on the indicated slippery road conditions or the slippery road conditions may be used to update a slip risk factor set during previous executions of the method.

If said slip risk factor is above a first predetermined threshold value said multi-clutch transmission is controlled such that an upcoming gear shift is performed as a power shift independently of if upcoming shift was determined to be performed as a power cut shift or power shift. Said first predetermined threshold value may be set based on a number of parameters. What route the vehicle travels, the type of the vehicle and the load of the vehicle may all be aspects that affect how the first threshold value is set.

Thus, by applying the method of the present invention the multi-clutch transmission will be more prone to perform upcoming gear shift as a power shift if there are indications suggesting that there is a risk for wheel spin. The higher the risk for wheel spin is, the higher will the slip risk factor be and once said slip risk factor is above said first predetermined threshold value gear change is performed by power shift. Performing a gear change by power shift lowers the risk of that wheel spin is initiated by said gear shift and will improve the predictability of the behaviour of the vehicle.

According to one aspect of the present invention said slip risk factor is set to a value between 0 and 1. If the slip risk factor is close to one there is a big risk that the wheels of the vehicle will slip whereas if said slip risk factor is close to 0 the risk of wheel spinning is low. Thus, said first predetermined threshold value is set to a value closer to 1 than to 0 if it is considered that the risk for wheel spin is immediate.

According to another aspect of the present invention the drivetrain further comprises an ICE, wherein the torque output of said ICE is controlled dependent on said road conditions. Further, said method of controlling said multi-clutch transmission comprises the steps of:
  decreasing torque transferred by said multi-clutch transmission to a first predetermined torque level,
  performing said power shift, and
  increasing the torque transferred by said multi-clutch transmission to a second predetermined torque level when the power shift is completed.

Said decrease and said increase in torque are performed over a longer time period than when said slip risk factor is below said predetermined threshold value. The first and second predetermined torque levels are preferably dependent on a momentary gear and a target gear and a difference in gear ratio there between.

According to the present invention it is possible to use a number of parameters, a number of ambient conditions or vehicle conditions as indications in order to detect and/or predict slippery road conditions. Also a number of available information sources can be used. In the following a number of such parameters, conditions and information sources are discussed.

The many different indications that can be used, including different parameters, conditions and information sources, in order to set a slip risk factor have to be processed according to different methods. The different indications, and ways of processing respective indications, can be used singly or in any combination. What indications of slippery road conditions that are used may e.g. be dependent on for which parameters or conditions information is available or what information sources that are available.

The load of the vehicle is one of the most influential factors when detecting and acting to prevent wheel spin. What is meant with load of the vehicle herein is the total weight of the vehicle including cargo. Such cargo may e.g. be loaded on a trailer or on a platform body of a vehicle. At take-off, the heavier the vehicle is the more force the wheels of the vehicle must exert on the road surface before the vehicle starts to move. This will increase the risk of wheel spin.

The load of the vehicle should not be confused with the load on the drive wheels of the vehicle. More load on the drive wheels increase the friction between the wheels and the road surface which counteracts wheel spin. Thus, increased load of the vehicle generally increases the risk of wheel spin, but if applied directly on the drive wheels of the vehicle wheel spin may also be counteracted. If load applied directly on the drive wheels increases or decreases the risk of wheel spin in total depends on vehicle parameters and ambient conditions.

How the load applied directly to the driving wheels affect the wheel spin properties are not further disclosed herein and is considered to be one of the vehicle specific parameters referred to.

Another important factor that may be detected and taken into account is the inclination of the road traveled. Detected wheel spin while driving uphill, which may cause the vehicle to stop, for a heavily loaded vehicle is especially problematic since if the vehicle is stopped at such conditions it may be problematic to start driving again.

Thus, according to one aspect of the present invention said indication of slippery road conditions comprises;
  detecting if a vehicle load exceeds a predetermined vehicle load threshold value, wherein the vehicle load threshold value may be set dependent on a number of parameters such as type of cargo or vehicle specific parameters, and
if said vehicle load is above said vehicle load threshold value;
  increasing said slip risk factor dependent oft a difference between said vehicle load threshold value and an actual vehicle load.

If the vehicle load exceeds the vehicle threshold value can be seen as an indication of that for the vehicle it is highly desirable to avoid wheel spin. The bigger the difference between the vehicle threshold value and the vehicle load is the more desirable is it to avoid wheel spin. By increasing the slip risk factor with a value corresponding to the difference between the vehicle load and the vehicle threshold value the vehicle will be more prone to shift gear by power shift the larger said difference is. This will reduce the risk of wheel spin induced by gear shift.

According to another aspect of the present invention said indication of slippery road conditions comprises;
  detecting if a road inclination exceeds a predetermined inclination threshold value, wherein the road inclination threshold value may be set dependent on a number of parameters such as road surface properties, vehicle specific parameters or predicted travel route, and if said road inclinations is above said inclination threshold value;
    increasing said slip risk like factor dependent on a difference between said inclination threshold value and an actual inclination.

The road surface properties are e.g. dependent on if the road surface is wet or dry, if the road is a dirt road covered by gravel or if the road is asphalted.

In accordance with what applies for vehicle load; that the road inclination exceeds the road inclination threshold value that can be seen as an indication of that it is highly desirable to avoid wheel spin. The bigger the difference between the road inclination threshold value and the detected road inclination is the mote desirable is it to avoid wheel spin. By increasing the slip risk factor with a value corresponding to the difference between the detected road inclination and the road inclination threshold value the vehicle will be more prone to shift gear by power shifting the larger said difference is. This will reduce the risk of wheel spin induced by gear shift.

According to yet another aspect of the present invention said indication of slippery road conditions comprises;
    detecting if a rotational speed of at least one rear wheel differs from a rotational speed of at least one front wheel with more than a predetermined rotational threshold value wherein
if said rotational speed difference is above said rotational threshold value:
    increasing said slip risk factor dependent on a value of said difference between said rotational threshold value and an actual rotational speed difference.

A significant difference in rotational speed between the front and rear wheels is a clear indication of that there is an imminent risk of wheel spin. According to a preferred aspect of the present invention said predetermined rotational threshold value may be approximately 20%, which corresponds to a 20% difference between the rotational speed of the front and rear wheels. By increasing the slip risk factor with a value corresponding to the difference between the difference in rotational speed between front and rear wheels and the rotational threshold value the vehicle will be more prone to shift gear by power shift the larger said difference is. This will reduce the risk of wheel spin induced by gear shift.

According to one aspect of the present invention said indication of slippery road conditions comprises at least one of:
    detecting an initiation of a predetermined driver initiated operation command, and
    increasing said slip risk factor with a predetermined value dependent on said driver initiated command.

Said predetermined driver initiated operation command, may be activating at least one in a group comprising or consisting of boggie lift, boggie press or differential lock. Each predetermined driver initiated operation command is associated with a predetermined value, wherein predetermined driver initiated commands which are considered to be more associated with actions taken to avoid wheel spin are associated with higher predetermined values. Depending on what predetermined driver initiated operation command that is initiated the slip risk factor is increased with respective predetermined value.

In corresponding manner, according to another aspect of the present invention said indication of slippery road conditions comprises at least one of:
    detecting an activation of a predetermined auxiliary system or driving mode,
    increasing said slip risk factor with a predetermined value dependent on activated auxiliary system or driving mode.

Said predetermined auxiliary system, of which activation indicates that there is an imminent risk of wheel spin, may be at least one in a group comprising or consisting of anti-spin system, active braking system (ABS), stability improving system or anti-skid system. Said driving mode may be any of the many generally occurring driving modes of vehicles of today such as e.g. Economy, Performance or Hybrid. The different driving modes may to a lesser or greater extent influence how the slip risk factor is set. E.g. a driving mode such as Economy may not have as significant effect on how the slip risk factor is set as a driving mode such as e.g. slippery road may have, if such driving modes can be selected. Each predetermined auxiliary system or driving mode is associated with a predetermined value, wherein activation of a predetermined auxiliary system or driving mode which are considered to be more associated with actions taken to avoid wheel spin are associated with higher predetermined values. E.g. may activation of anti-spin systems or activation of a specific slippery road driving mode be associated with higher predetermined values than anti-skid systems or an economy driving mode. Depending on what predetermined auxiliary system or driving mode that is activated the slip risk factor may be increased with respective predetermined value.

The driving modes referred to above are considered to also comprise manually activated warning alerts. It is e.g. possible that a vehicle may be provided with a button by which the driver manually can indicate that be or she believes that there is an increased risk for wheel spin. By pushing such button, thus activating a wheel spin warning alert, the slip risk factor preferably is increased with a predetermined value.

The two latter aspects of the present invention both has the advantage that actions taken by the driver, who may possess important information e.g. regarding upcoming weather changes, can be considered when setting the slip risk factor. This may improve the accurateness of the slip risk factor significantly and thus give a more optimized shift behaviour.

According to another aspect of the present invention said method comprises the steps of:
    receiving information indicating slippery road conditions, wherein receiving in this context may be either detecting or being provided with information from an external information source, and wherein such received information may include the severity of the indicated slippery road conditions as well as the position of where the slippery road conditions have been indicated,
    detecting a current position of said vehicle, and
    evaluating if said indication of slippery road condition indications is relevant for said vehicle.

The relevancy of indicated slippery road conditions is dependent on how close the position, of where slippery road conditions have been Indicated is to the current position, of the vehicle. The received information indicating slippery road conditions may be provided from information sources such as other vehicles of a vehicle fleet, information received from a central database or broadcasted traffic information. Further, if said indication is considered to be relevant the aspect of the present invention further comprises;
    increasing said slip risk factor with a predetermined value dependent on said relevance.

Thus, the more severe the indicated slippery road conditions are and the closer to the position where slippery road conditions have been indicated the vehicle currently is, the higher will the increase of the slip risk factor be.

According to still one aspect of the present invention said method further comprises;
storing said received information indicating slippery road conditions and continuously
detecting a current vehicle position, and
comparing said vehicle position with said stored information indication slippery road conditions and evaluating if said indication of slippery road conditions is relevant for said vehicle.

If slippery road conditions have been indicated at a specific geographical position it is reasonable to believe that the risk of slippery road persists for a period of time at that geographical position. Thus, if a vehicle returns to a position where previously slippery road conditions has been detected, either by that the vehicle itself has detected slippery road conditions or by that the vehicle has been provided with external information indicating slippery road conditions at the position, the slip risk factor is preferably increased with a predetermined value. The predetermined value is preferably dependent on said relevance in accordance to what previously has been described. By applying this aspect of the present invention it is possible to utilize previously collected information regarding slippery road conditions in order to improve the safety by setting a slip risk factor as accurate as possible.

Consequently, according to this aspect of the present invention if a vehicle has indicated slippery road conditions at a certain position and subsequently returns to the same position the slip risk factor will be increased. This aspect of the present invention is particularly relevant for construction vehicles and other vehicles which drive the same route numerous of times during a time interval.

According to yet one aspect of the present invention said slip risk factor is dependent on a time since said stored information indicating slippery road conditions was stored. Depending on how and where slippery road conditions previously were identified they may be more or less relevant after a period of time. If heavy rain was part of the reason for that slippery road conditions were identified the time for which an increase of the slip risk factor is relevant may be a few hours whereas if slippery road conditions were identified in a valley at an ambient temperature below the freezing point the increase in slip risk factor may be relevant as long as the temperature stays below the freezing point, which may be a matter of months. Another way of ensuring that only relevant information is used is letting the slip risk factor decrease dependent on a lapsed time since detection of said indication of slippery road conditions. Considering the time during which possible increase in slip risk factor is relevant helps ensure that only relevant information is used.

Thus, also previously events experienced by respective vehicle can be used in order to predict wheel spin. Thus, if a vehicle returns to an area adjacent to a spot where wheel spin for that vehicle previously has occurred, this information can be used in order to set a suitable slip risk factor. The closer to the spot the vehicle is driving, the closer in time such previously encountered event occurred and the more similar ambient the conditions such as e.g. ambient temperature is, the higher effect may such previously encountered events have on how the slip risk factor is set. On the other hand, if a vehicle returns to an area where slippery road conditions previously has been indicated, but now no indications of slippery road conditions can be detected, the slip risk factor preferably is decreased. This also applies if provided external information has indicated high risk of slippery road conditions but no such conditions can be detected by the vehicle. Also in this case the slip risk factor preferably is decreased.

The present invention also comprises a computer program comprising program code means for performing the steps of any of the embodiments of the method of the present invention when said program is run on a computer. The present invention also comprises a computer readable medium carrying a computer program comprising program code means for performing the steps of any embodiment of the method when said program product is run on a computer. Finally the present invention comprises a control unit for controlling energy flows of a vehicle, wherein the control unit is configured to perform the steps of any embodiment of the method of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION

Figure 1:
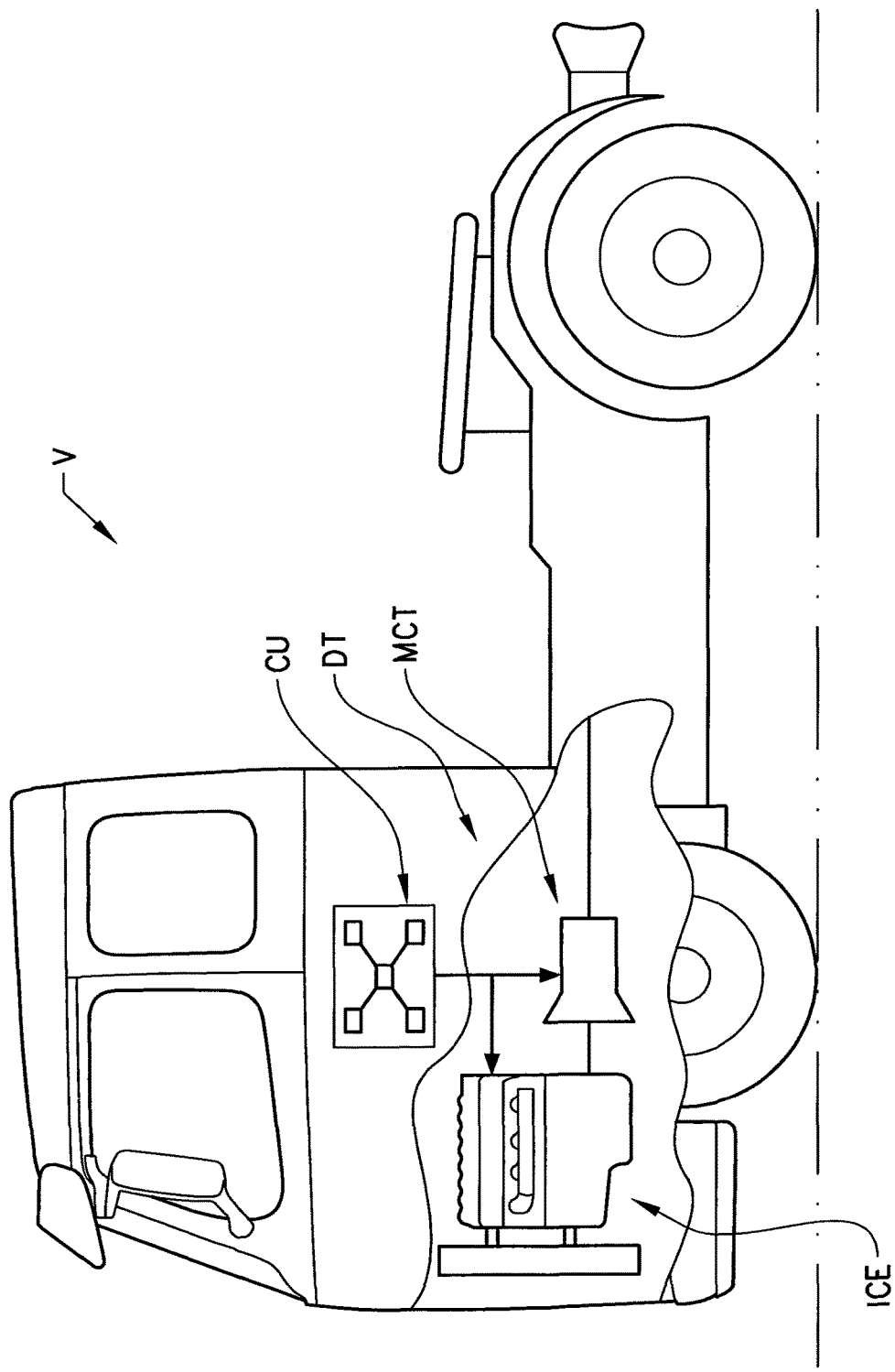
FIG. 1 shows a schematic view of a heavy-duty vehicle.

FIG. 1 shows a heavy-duty vehicle V comprising a drivetrain DT. The drivetrain DT comprises an internal combustion engine ICE, a multi-clutch transmission MCT and a control unit CU. The internal combustion engine ICE is connected to the multi-clutch transmission MCT such that the torque delivered by the combustion engine ICE for propulsion of the vehicle V is controllable by the multi-clutch transmission MCT. The combustion engine ICE and the multi-clutch transmission MCT is connected to and controlled by the control unit CU. FIG. 1 shows a very simplified embodiment and should not be seen as limiting.

The multi-clutch transmission MCT is adapted to be controlled to perform gear shifts as either a power shift or as a power cut shift. Which shift-type that is selected is dependent on vehicle parameters. Typically, if e.g. the driving currently is static, such as when driving at constant speed on a highway, or when gears are skipped power cut shift is preferably used whereas if the driving is dynamic, such as when accelerating during a take-over, power shift is preferably used. A driver will generally anticipate power cut shift with torque interruption to be more noticeably than power shift.

Figure 2:
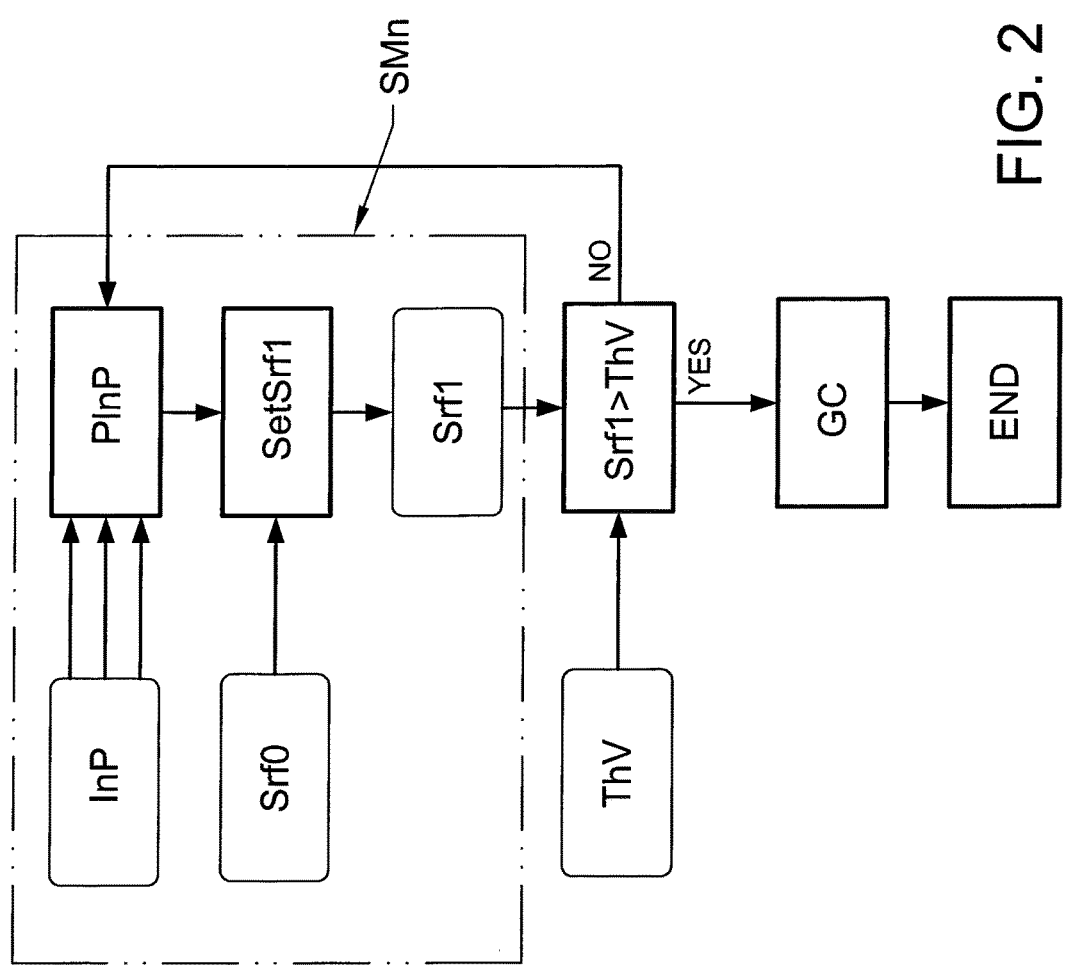
FIG. 2 shows a schematic block diagram over a first embodiment of the present invention.

FIG. 2 shows a schematic block diagram over a first embodiment of the present invention. The method is initiated by a process slippery road conditions operation PInP. The process slippery road conditions operation PInP is based on at least one of, or a combination of, a plurality of possible indications of slippery road conditions InP. The indications of slippery road conditions InP comprises parameters indicating slippery road conditions which e.g. may be one, or a combination of:

vehicle specific parameters, such as e.g. vehicle load, vehicle inclination, difference in rotational speed between front and rear wheels or difference in rotational speed between wheels mounted on the left and the right side of the vehicle, auxiliary systems activated, such as e.g. that anti-spin is activated, that vehicle stability systems are activated or that windshield wipers are activated at the same time as the ambient temperature is below the freezing point, received information, such as e.g. broadcasted traffic information, information shared within a vehicle fleet or from a central database.

other vehicle information, such as e.g. that the wheels are sliding sideways or that the vehicle goes straight forward even if the steering wheel is turned, recognition, that the vehicle control unit recognizes that slippery road conditions previously has been indicated at the current position or that another vehicle in a vehicle fleet has indicated slippery road conditions.

The processed slippery road conditions are subsequently used to set a slip risk factor. This step of the method of the present invention is performed during a set slip risk factor operation SetSrf1. In the embodiment shown in FIG. 2 the set slip risk factor operation SetSrf1 is additionally based on a previously set slip risk factor Srf0.

The part of the method disclosed in FIG. 2, comprising the process slippery road conditions operation PInP and the set slip risk factor operation SetSrf1, where an updated slip risk factor Srf1 is set is referred to as a sub method Srf0.

According to the present invention the updated slip risk factor Srf1 is subsequently further processed such that an evaluation whether upcoming shift should be performed by power shift is performed.

Subsequently, a set slip risk factor Srf1 is evaluated against a threshold value ThV in a slip risk factor evaluation operation Srf1>ThV, wherein if the slip risk factor Srf1 is higher than the threshold value ThV a multi-clutch transmission of a vehicle for which the method of the present invention is applied is controlled such that said upcoming shift is performed as a power shift. The gear shift is performed in a gear change operation GC.

Figure 3:
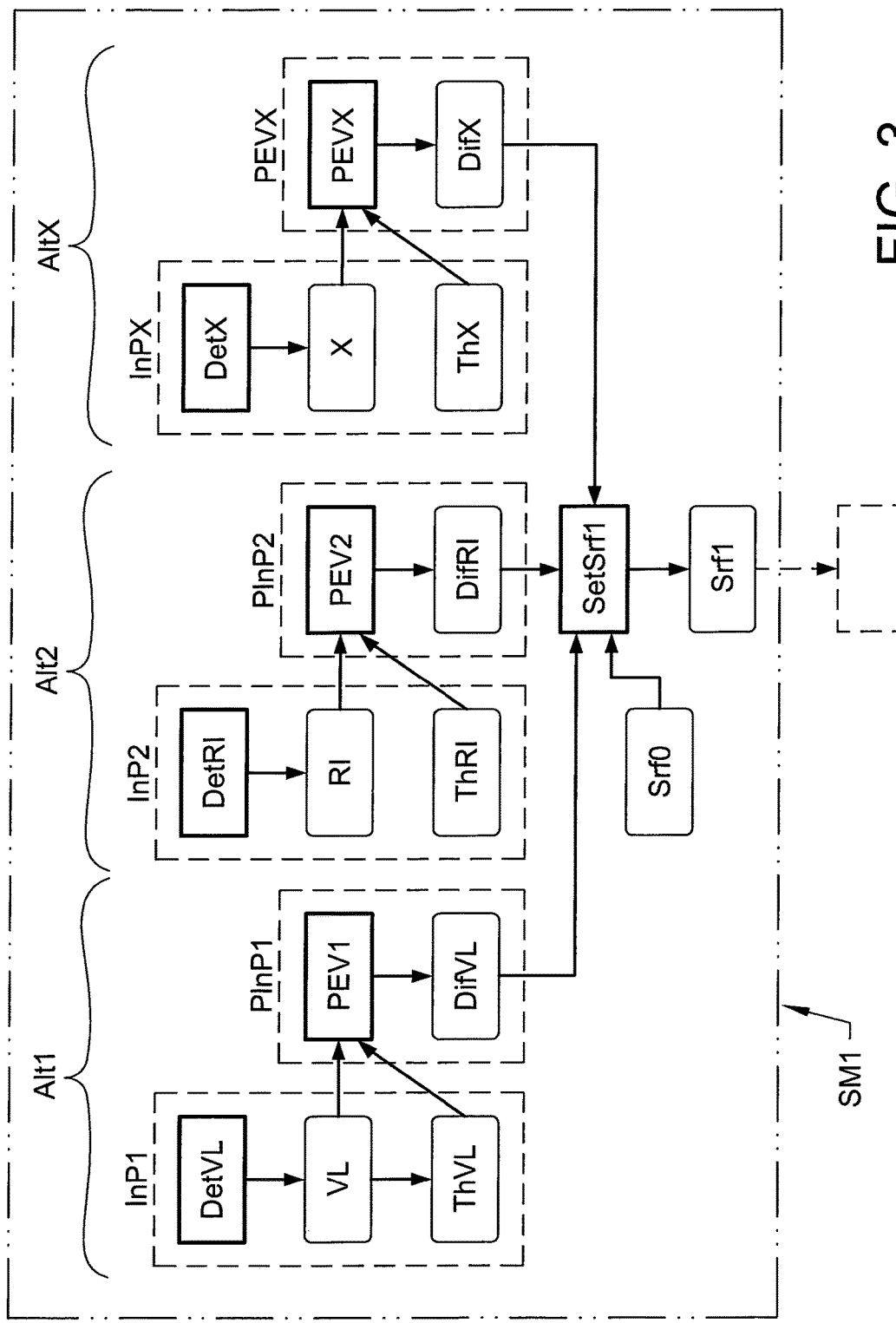
FIG. 3 shows a schematic block diagram over an embodiment of apart of the inventive method where an updated slip risk factor Srf1 is set.

FIG. 3 shows a schematic block diagram disclosing three exemplary embodiments of how different Indications of slippery road conditions InP1, InP2, InPX can be used to set an updated slip risk factor Srf1. The setting of the updated slip risk factor Srf1 disclosed in FIG. 3 is performed according to a sub method SM1, wherein SM1 is one example of the sub method SMn disclosed in FIG. 2. The three alternative embodiments Alt1, Alt2, AltX disclose how different indications of slippery road conditions InP1, InP2, InPX may be used in order to set an updated slip risk factor Srf1. Respective alternative embodiment Alt1, Alt2, AltX of updating the slip risk factor Srf0 is based on at least one detected vehicle parameter.

According to the first alternative embodiment Alt1 a vehicle load VL is detected in a detect vehicle load operation DetVL. The vehicle load VL and a predetermined vehicle load threshold value ThVL is subsequently provided to a first process slippery road conditions operation PInP1, comprising a first parameter evaluation operation PEV1. In the first parameter evaluation operation PEV1 is detected if the detected vehicle load VL exceeds the vehicle load threshold value ThVL, and if so a vehicle load difference value DifVL between the detected vehicle load VL and the vehicle load threshold value ThVL is determined. The vehicle load difference value DifVL is subsequently used to update the previously set slip risk factor Srf0 to an updated slip risk factor Srf1 in the set slip risk factor operation SetSrf1.

The vehicle load detection operation DetVL, providing the vehicle load VL, and the predetermined vehicle load threshold value ThVL is one example of indications of slippery road conditions InP that can be used in the process slippery road conditions operation PInP according to the present invention as disclosed in FIG. 2.

The first parameter evaluation operation PEV1 providing the vehicle load difference value DifVL is one example of a process slippery road conditions operation PInP1 according to the present invention as disclosed in FIG. 2.

According to the second alternative embodiment Alt2 disclosed a road inclination RI is detected in a road inclination detection operation DetRI. The detected road inclination RI and a predetermined road inclination threshold value ThRI is subsequently provided to a second process slippery road conditions operation PInP2, comprising a second parameter evaluation operation PEV2. In the second parameter evaluation operation PEV2 is detected if the detected road inclination RI exceeds the road inclination threshold value ThRI, and if so a road inclination difference value DifRI between the detected road inclination RI and tire road inclination threshold value ThRI is determined. The road inclination difference value DifRI is subsequently used to update the previously set slip risk factor Srf0 to an updated slip risk factor Srf1 in the set slip risk factor operation SetSrf1.

Corresponding to the first alternative embodiment Alt1 the road inclination detection operation DetRI, providing the road inclination RI, and the predetermined road inclination threshold value ThRI is one example of indications of slippery road conditions InP that can be used in the process slippery road conditions operation PInP according to the present invention as disclosed in FIG. 2.

The second parameter evaluation operation PEV2 providing the road inclination difference value DifRI is one example of the process slippery road conditions operation PInP2 according to the present invention as disclosed in FIG. 2.

The third alternative embodiment AltX discloses a generic embodiment wherein any of the many possible indications of slippery road conditions InPX are provided to a process slippery road conditions operation PInPX.

The generic parameters indicating slippery road conditions InPX may comprise a detection operation DetX detecting at least one vehicle parameter X what can be processed such that actual or possible future wheel spin can be detected. The detected vehicle parameter X can subsequently be provided to process slippery road conditions operation PInPX. A s for the alternative embodiments Alt1, Alt2 previously disclosed the detected vehicle parameter X may be evaluated in regard to a threshold value ThX, wherein the threshold value ThX also is provided to the process slippery road conditions operation PInPX comprising parameter evaluation operation PEVX, as a part of the indications of slippery road conditions InPX. The detected vehicle parameter X and the threshold value ThX can subsequently be processed in the process slippery road conditions operation PInPX such that a vehicle parameter difference value DifX is obtained. The vehicle parameter difference value DifX can in turn be provided to the set slip risk factor operation SetSrf1 together with a previously set slip risk factor Srf0 such that an updated slip risk factor Srf1 can be set.

The first, second and third alternative embodiments Alt1, Alt2, AltX of how an updated slip risk factor Srf1 can be set can be applied singly or in my combination.

Figure 4:
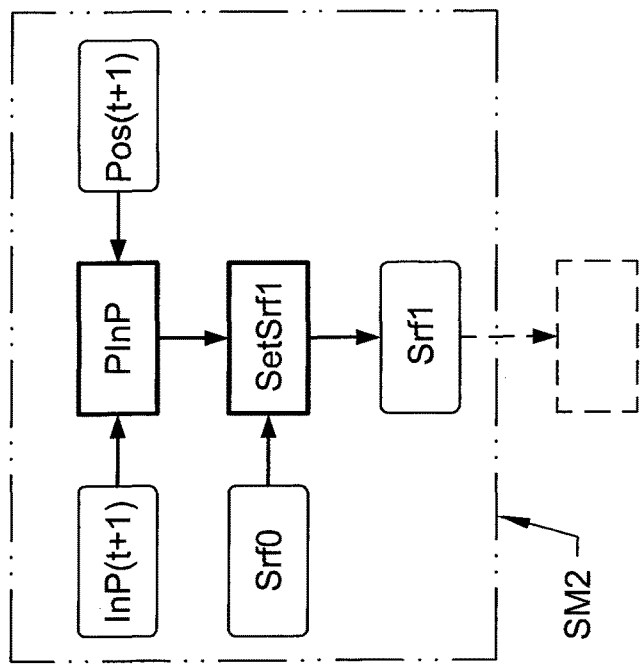
FIG. 4 shows another embodiment of a part of the inventive method where an updated slip risk factor Srf1 is set.

FIG. 4 shows another embodiment of a sub method SM2 of the sub method SMn as disclosed in FIG. 2. In the embodiment of the sub method SM2 disclosed in FIG. 4 an indications of slippery road conditions InP(t+1) and a current vehicle position Pos(t+1), both taken at the time t+1, is provided to the process slippery road conditions operation PInP. The current vehicle position Pos(t+1) may be obtained by any suitable means such as e.g. a global satellite positioning system. In the slippery road conditions operation PInP is evaluated if the indications of slippery road conditions InP(t+1) is relevant considering the current vehicle position Pos(t+1). The indications of slippery road conditions InP(t+1) and the relevance of the indications of slippery road conditions InP(t+1) is subsequently provided as input to the set slip risk factor operation SetSrf1, together with a previously set slip risk factor Srf0 such that an updated slip risk factor Srf1 can be set.

Figure 5:
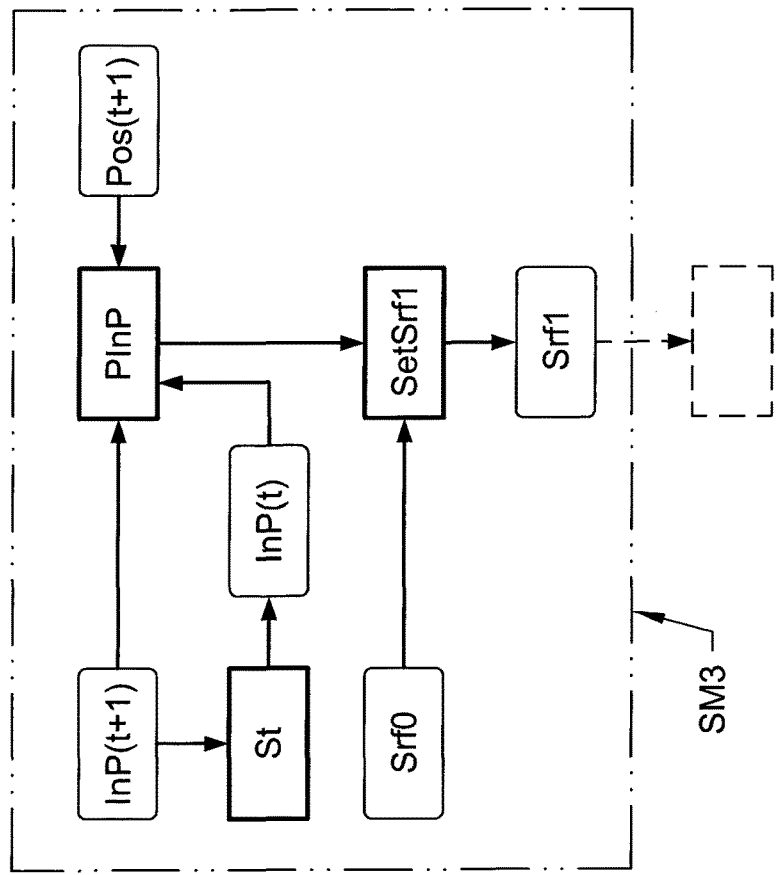
FIG. 5 shows yet another embodiment of a part of the inventive method where an updated slip risk factor Srf1 is set.

FIG. 5 shows yet another embodiment of a sub method SM3 of the sub method SMn as disclosed in FIG. 2. In the embodiment of the sub method SM3 disclosed in FIG. 5 the embodiment of the sub method SM2 disclosed in FIG. 4 is applied, but additionally the indications of slippery road conditions InP(t+1) are stored in a store parameters operation St. In the store parameter operation St have previously detected indications of slippery road conditions InP(t) continuously been stored. According to the embodiment disclosed in FIG. 5 not only the indications of slippery road conditions InP(t+1) is evaluated considering relevance in regards to the current vehicle position Pos(t+1) but the relevance of all previously stored indications of slippery road conditions InP(t) are considered. The relevance of the stored and currently provided indications of Slippery road conditions InP(t); InP(t+1) is subsequently provided as input to the set slip risk factor operation SetSrf1, together with a previously set slip risk factor Srf0 such that an updated slip risk factor Srf1 can be set.

Figure 6:
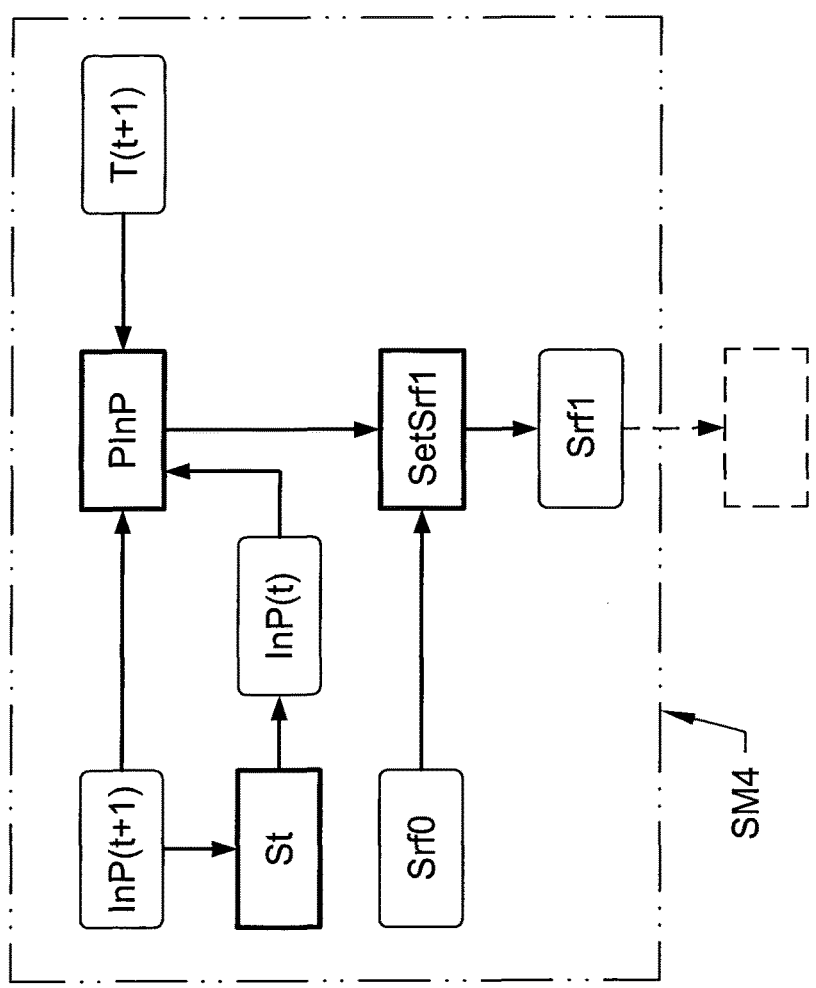
FIG. 6 shows still another embodiment of a part of the inventive method where an updated slip risk factor Srf1 is set.

FIG. 6 shows still another embodiment of a sub method SM4 of the sub method SMn as disclosed in FIG. 2. In the embodiment of the sub method SM4 disclosed in FIG. 6 the indications of slippery road conditions InP(t+1) and a current time T(t+1), both taken at the time t+1, is provided to the process slippery road conditions operation PInP. As for the embodiment disclosed in FIG. 5 the indications of slippery road conditions InP(t+1) is continuously stored in the store parameters operation St. The relevance of the previously stored indications of slippery road conditions InP(t) are evaluated by comparing current time T(t+1) and time since respective stored indications of slippery road conditions InP(t) where stored. The relevance of the stored indications of slippery road conditions InP(t) and the currently provided Indications of slippery road conditions InP(t+1) are subsequently provided as input to the set slip risk factor operation SetSrf1, together with a previously set slip risk factor Srf0 such that an updated slip risk factor Srf1 can be set.

The disclosed sub methods SM1, SM2, SM3, SM4 of FIG. 3 to 6 are all examples of different embodiments of how the sub method SMn as disclosed in FIG. 2 can be performed. Which sub method SMn, SM1, SM2, SM3, SM4 that is used may be dependent on provided indications of slippery road conditions. The exemplary embodiments of the sub methods SM2 or SM3 can be combined with the sub methods SM1 and/or SM4. Sub method SM1 can also be combined with sub method SM4.

It is to be understood that the present invention is not limited to the embodiments described above and illustrated in the drawings; rather, the skilled person will recognize that many changes and modifications may be made within the scope of the appended claims.

The invention claimed is:

1. A method for controlling a drivetrain of a vehicle, wherein the drivetrain comprises a multi-clutch transmission, wherein the shifting of the multi-clutch transmission is adapted to be performed either by power cut shifting or by power shifting dependent on predetermined vehicle shift conditions, wherein
the method comprises the steps of:
detecting at least one of a plurality of indications of slippery road conditions,
setting a slip risk factor, dependent on the indication of slippery road conditions, and,
if the slip risk factor is above a first predetermined threshold value;
controlling the multi-clutch transmission such that an upcoming gear shill is performed as a power shift independently of if upcoming shift was determined to be performed as a power cut shift or as a power shift.

2. A method according to claim 1, wherein the drivetrain further comprises an internal combustion engine and where the torque output of the internal combustion engine is controlled dependent on the indications of slippery road conditions and the method of controlling the multi-clutch transmission further comprises the steps of:
decreasing torque transferred by the multi-clutch transmission to a first predetermined torque level,
performing the power shift,
increasing the torque transferred by the multi-clutch transmission when the power shift is completed to a second predetermined torque level,
wherein the decrease and the increase in torque are performed over a longer time period than when the slip risk factor is below the predetermined threshold value.

3. A method according to claim 2, wherein the first and second predetermined torque levels are dependent on a momentary gear and a target gear and a difference in gear ratio there between.

4. A method according to claim 1, wherein the indication of slippery road conditions comprises;
detecting if a vehicle load exceeds a predetermined vehicle load threshold value, wherein
if the vehicle load is above the vehicle load threshold value; increasing the slip risk factor dependent on a difference between the vehicle load threshold value and an actual vehicle load.

5. Method according to claim 1, wherein the indication of slippery road conditions comprises;
detecting if a road inclination exceeds a predetermined road inclination threshold value, wherein
if the road inclination is above the road inclination threshold value;
increasing the slip risk factor dependent on a difference (DifRI) between the road inclination threshold value and an actual road inclination.

6. Method according to claim 1, wherein the indication of slippery road conditions comprises;

detecting if a rotational speed of a rear wheel differs from a rotational speed of a front wheel with more than a predetermined rotational threshold value, wherein if the rotational speed difference is above the rotational threshold value:

increasing the slip risk factor dependent on a value of the difference between the rotational threshold value and an actual rotational speed difference.

7. A method according to claim 1, wherein the indication of slippery road conditions comprises at least one of:

detecting an initiation of a predetermined driver initiated operation command, and increasing the slip risk factor with a predetermined value dependent on the driver initiated command.

8. A method according to claim 1, wherein the indication of slippery road conditions comprises at least one of:

detecting an activation of a predetermined auxiliary system or driving mode, increasing the slip risk factor with a predetermined value dependent on activated auxiliary system or driving mode.

9. A method according to claim 1, wherein the method comprises the steps of:

receiving information indicating slippery road conditions, detecting a current position of the vehicle, and
evaluating if the indication of slippery road condition indications is relevant for the vehicle, and if the indication of slippery road conditions is relevant;
increasing the slip risk factor with a predetermined value dependent on the relevance.

10. A method according to claim 9, wherein the method further comprises:

storing the received information indicating slippery road conditions (InP) and continuously
detecting a current vehicle position, and
comparing the vehicle position with the stored information indication slippery road conditions (InP); and
evaluating if the indication of slippery road conditions (InP) is relevant for the vehicle, and if the indication of slippery road condition is relevant;
increasing the slip risk factor with a predetermined value dependent on the relevance.

11. A method according to claim 10, wherein the increasing of the slip risk factor is dependent on a time since the stored information indicating slippery road conditions (InP) is stored.

12. A method according to claim 1, wherein the slip risk factor is decreasing dependent on a lapsed time since detection of the indication of slippery road conditions (InP).

13. A computer comprising a computer program for performing the steps of claim 1 when the program is run on the computer.

14. A non-transitory computer readable medium carrying a computer program for performing the steps of claim 1 when the program product is run on a computer.

15. A control unit for controlling a drivetrain of a vehicle, the control unit being configured to perform the steps of the method according to claim 1.

* * * * *